(12) United States Patent
Yanagisawa

(10) Patent No.: US 9,891,433 B2
(45) Date of Patent: Feb. 13, 2018

(54) VIRTUAL IMAGE GENERATION DEVICE AND HEAD-UP DISPLAY

(71) Applicant: PIONEER CORPORATION, Kanagawa (JP)

(72) Inventor: Takuma Yanagisawa, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 19 days.

(21) Appl. No.: 14/772,240

(22) PCT Filed: Mar. 27, 2013

(86) PCT No.: PCT/JP2013/059125
§ 371 (c)(1),
(2) Date: Sep. 2, 2015

(87) PCT Pub. No.: WO2014/155588
PCT Pub. Date: Oct. 2, 2014

(65) Prior Publication Data
US 2016/0004077 A1    Jan. 7, 2016

(51) Int. Cl.
*G02B 27/14* (2006.01)
*G02B 27/01* (2006.01)
*B60K 35/00* (2006.01)
*G02B 5/08* (2006.01)

(52) U.S. Cl.
CPC .......... *G02B 27/0101* (2013.01); *B60K 35/00* (2013.01); *G02B 5/0825* (2013.01);
(Continued)

(58) Field of Classification Search
CPC ............ G02B 27/0101; G02B 27/0172; G02B 27/0103; G02B 27/0149;
(Continued)

(56) References Cited

U.S. PATENT DOCUMENTS 4,261,647 A   4/1981 Ellis
4,582,389 A * 4/1986 Wood ................ G02B 27/0103
345/7

(Continued)

FOREIGN PATENT DOCUMENTS

EP   0009332 A1   4/1980
EP   0943934 A2   9/1999
(Continued)

OTHER PUBLICATIONS

International Search Report, PCT/JP2013/059125, dated May 28, 2013.
(Continued)

*Primary Examiner* — Alicai M Harrington
(74) *Attorney, Agent, or Firm* — Young & Thompson

(57) ABSTRACT

The virtual image generation device which visualizes images formed by an image forming unit as virtual images includes: a first optical element and a second optical element arranged opposite to each other along a travelling direction of an image light corresponding to the images. The first optical element and the second optical element have a characteristic of reflecting the light having a wavelength corresponding to the image light in accordance with an incident angle of the light and transmitting the light having the wavelength other than the wavelength corresponding to the image light, and give a predetermined optical effect only to the image light.

15 Claims, 16 Drawing Sheets

(52) U.S. Cl.
CPC ..... *G02B 27/0103* (2013.01); *G02B 27/0149* (2013.01); *G02B 27/0172* (2013.01); *G02B 27/0179* (2013.01); *B60K 2350/2052* (2013.01); *B60K 2350/2056* (2013.01); *B60K 2350/922* (2013.01); *G02B 2027/0107* (2013.01); *G02B 2027/0109* (2013.01); *G02B 2027/0123* (2013.01); *G02B 2027/0154* (2013.01); *G02B 2027/0159* (2013.01); *G02B 2027/0174* (2013.01); *G02B 2027/0178* (2013.01); *G02B 2027/0181* (2013.01)

(58) Field of Classification Search
CPC .... G02B 2027/0159; G02B 2027/0178; G02B 2027/0123; B60K 35/00; B60K 2350/2052; B60K 2350/2056; B60K 2350/922
See application file for complete search history.

(56) References Cited

U.S. PATENT DOCUMENTS

| | | | | |
|---|---|---|---|---|
| 4,655,540 A | * | 4/1987 | Wood | G02B 27/0103 359/13 |
| 5,071,210 A | | 12/1991 | Arnold | |
| 5,204,666 A | * | 4/1993 | Aoki | B60K 37/02 340/980 |
| 5,504,622 A | | 4/1996 | Oikawa et al. | |
| 5,917,459 A | * | 6/1999 | Son | G02B 27/0103 340/980 |
| 2003/0099009 A1 | | 5/2003 | Noda | |
| 2008/0238814 A1 | | 10/2008 | Ishikawa | |

FOREIGN PATENT DOCUMENTS

| | | |
|---|---|---|
| JP | 01-100511 | 4/1989 |
| JP | 06-270716 | 9/1994 |
| JP | 09-50227 | 2/1997 |
| JP | 2000-233665 | 8/2000 |
| JP | 2002-052953 | 2/2002 |
| JP | 2006-350934 | 12/2006 |
| JP | 2009-067333 | 4/2009 |
| JP | 4928014 | 5/2012 |
| WO | WO 2012/117497 | 9/2012 |

OTHER PUBLICATIONS

Extended European Search Report (EESR) Appln. No. 13880386.1; dated Oct. 28, 2016.

* cited by examiner

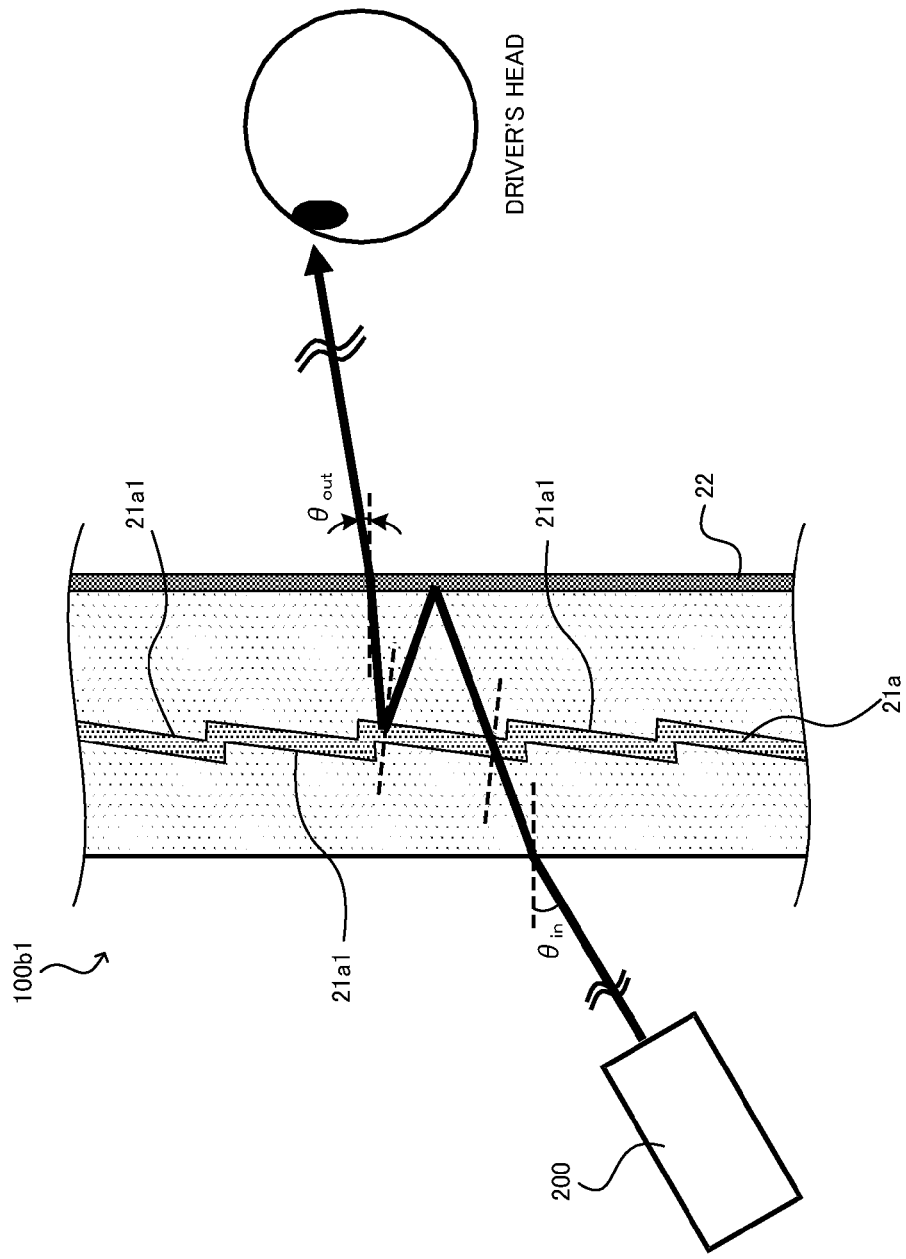

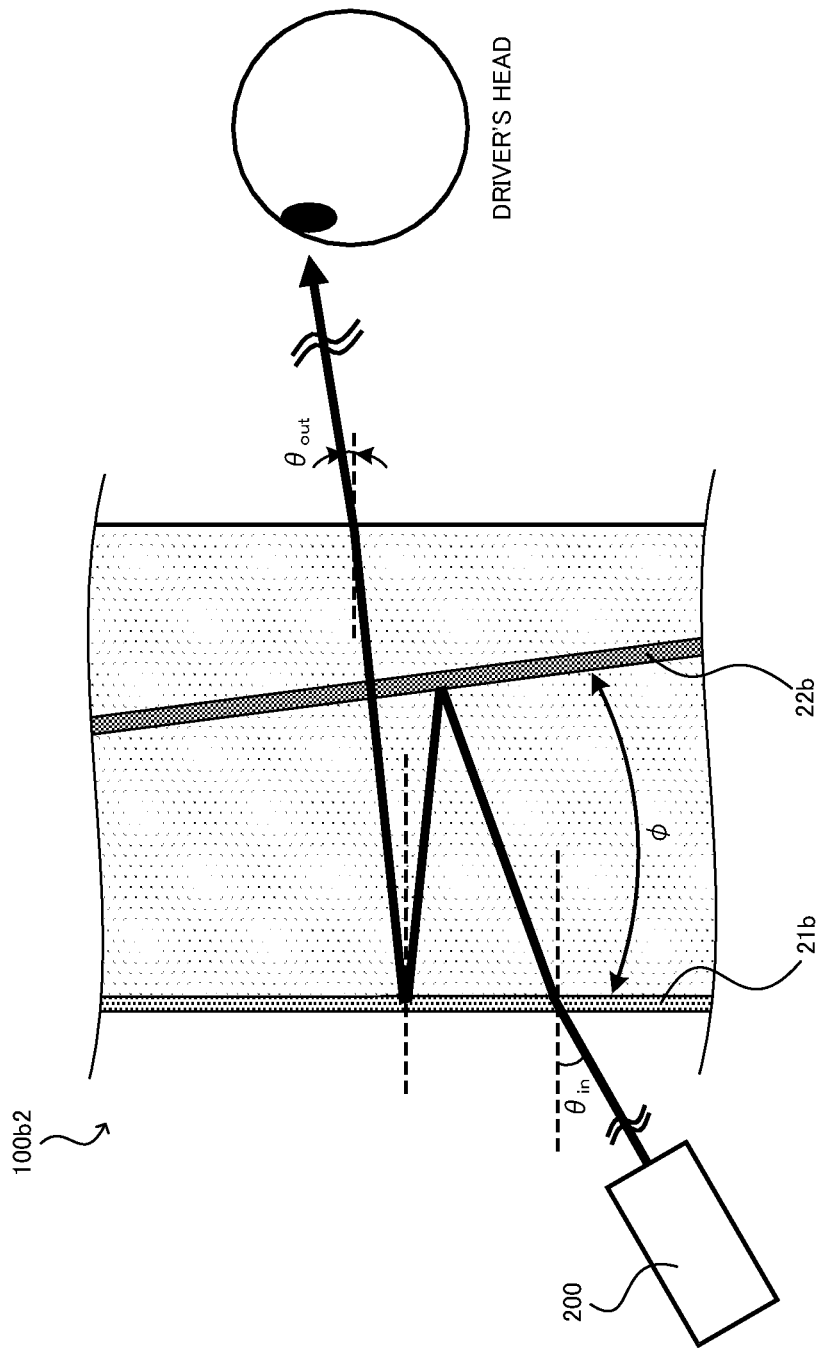

VIRTUAL IMAGE GENERATION DEVICE AND HEAD-UP DISPLAY

TECHNICAL FIELD

The present invention relates to a technical field of visualizing images as virtual images.

BACKGROUND TECHNIQUE

Conventionally, it is known a display device such as a head-up display (hereinafter referred to as "HUD") which visualizes images as virtual images (for example, Patent References 1 and 2). Normally, by the HUD, real images formed by a real image display device (i.e., images on an LCD display or images projected on a screen by a projector) is recognized by a driver as virtual images by the use of a half mirror, called as a combiner, disposed ahead of a visual field of the driver. Thus, the driver can visually recognize meters, navigation information and the like, in a manner superimposed on a front view, while keeping his or her visual line ahead without dropping the visual line.

PRIOR ART REFERENCES

Patent References

Patent Reference 1: Japanese Patent Application Laid-open under No. 06-270716
Patent Reference 2: Japanese Patent Application Laid-open under No. 2002-052953

SUMMARY OF INVENTION

Problem to be Solved by the Invention

When the size of the combiner is fixed, the maximum viewing angle of the virtual image visually recognized by the driver is determined dependently upon the distance between the combiner and the driver. Namely, the viewing angle becomes large when the combiner is near to the driver, and the viewing angle becomes small when the combiner is far from the driver. Therefore, in order to visualize as large virtual image as possible, it is desired to position the combiner as close to the driver as possible. However, the combiner is frequently arranged on the dashboard in terms of the place where the combiner can be set (For example, see Patent Reference 1).

On the other hand, recently there has been proposed a HUD in which the combiner is mounted near the ceiling (i.e., near the sun visor) so as to enlarge the viewing angle (For example, see Patent Reference 2). In this HUD, since the real image display device must be arranged on the driver side with respect to the combiner (to make the reflected light of the real image incident upon eyes), basically it is also necessary to mount the real image display device on the ceiling. Therefore, there are such disadvantages that the driver feels a sense of oppression and that the power lines must be drawn to the ceiling, making the mounting work troublesome.

The above is an example of the problem to be solved by the present invention. It is an object of the present invention to provide a virtual image generation device capable of appropriately visualize desired virtual images, without making the user feel the sense of oppression and/or discomfort.

Means for Solving the Problem

According to the invention described in claims, a virtual image generation device which visualizes images formed by an image forming unit as virtual images comprises: a first optical element and a second optical element arranged opposite to each other along a travelling direction of an image light corresponding to the images, wherein the first optical element and the second optical element have a characteristic of reflecting the light having a wavelength corresponding to the image light in accordance with an incident angle of the light and transmitting the light having the wavelength other than the wavelength corresponding to the image light, and give a predetermined optical effect only to the image light.

Also, according to the invention described in claims, a head-up display comprises: an image forming unit; and the virtual image generation device which visualizes the image formed by the image forming unit as the virtual images.

BRIEF DESCRIPTION OF THE DRAWINGS

FIG. 8 illustrates a configuration of a combiner according to a first modified example of the second embodiment.
FIG. 9 illustrates a configuration of a combiner according to a third modified example of the second embodiment.

DETAILED DESCRIPTION OF THE PREFERRED EMBODIMENTS

Figure 1:
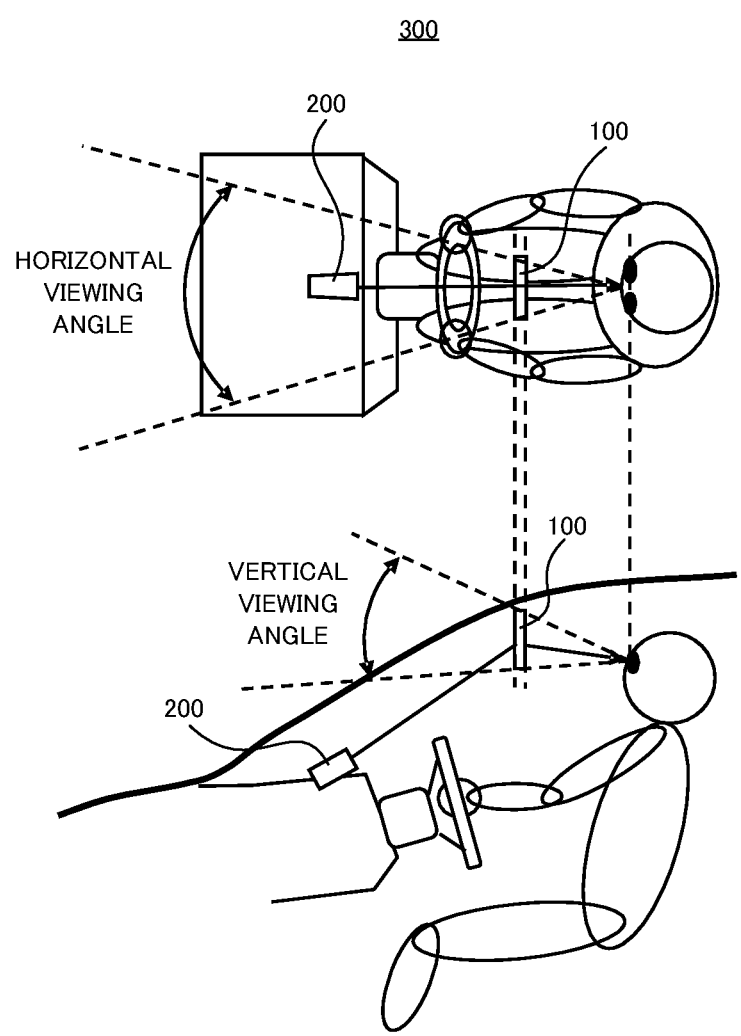
FIG. 1 illustrates a basic configuration of a HUD according to embodiments.

According to one aspect of the present invention, there is provided a virtual image generation device which visualizes images formed by an image forming unit as virtual images, comprising: a first optical element and a second optical element arranged opposite to each other along a travelling direction of an image light corresponding to the images, wherein the first optical element and the second optical element have a characteristic of reflecting the light having a wavelength corresponding to the image light in accordance with an incident angle of the light and transmitting the light having the wavelength other than the wavelength corresponding to the image light, and give a predetermined optical effect only to the image light.

The above virtual image generation device includes a first and a second optical elements serving as wavelength filters having dependence to the incident angle (a wavelength-selective transmission layer or a wavelength-selective reflection layer), and gives the predetermined optical effect only to the image light. Thus, desired virtual images can be appropriately generated for the images formed by the image forming unit.

In one mode of the above virtual image generation device, the first optical element and the second optical element are arranged in parallel with each other, and give the image light an effect of reflecting the light by an angle different from the incident angle, as the predetermined optical effect.

In this mode, the first and second optical elements give the image light the diffractive-reflection effect which reflects the light with the reflection angle different from the incident angle. According to this mode, by utilizing the diffractive-reflection, the incident angle and the reflection angle freely set can be used.

In other mode of the above virtual image generation device, the first optical element at least has the characteristic of reflecting the image light having a first angle as the incident angle, the first angle being an angle of the image light entering the virtual image generation device, and the second optical element at least has the characteristic of reflecting the image light having a second angle as the incident angle, the second angle being an angle with which the image light reflected by the first optical element enters. Thus, only the image light is passed through the virtual image generation device to change its light direction and is guided to the desired direction.

In still another mode of the above virtual image generation device, the second optical element has the characteristic of transmitting the image light having the first angle as the incident angle, and the first optical element has the characteristic of transmitting the image light having a third angle as the incident angle, the third angle being an angle with which the image light reflected by the second optical element enters.

Preferably, in the above virtual image generation device, the first optical element has the characteristic of reflecting the image light entered with the first angle by the second angle larger than the first angle, and the second optical element has the characteristic of reflecting the image light entered with the second angle by the third angle smaller than the second angle.

In still another mode of the above virtual image generation device, the first optical element and the second optical element further give the image light a lens effect as the predetermined optical effect. Thus, the virtual image generation device having a magnification can be realized, and the distance of the virtual image may be changed far or near.

In a preferred embodiment, the first and second optical elements are volume type HOEs. In another preferred embodiment, the first and second optical elements are dielectric multilayers. In still another preferred embodiment, at least one of the first and second optical elements is a volume type HOE. In still another preferred embodiment, at least one of the first and second optical elements is a dielectric multilayer.

According to another aspect of the present invention, a head-up display comprises: an image forming unit; and the virtual image generation device which visualizes the image formed by the image forming unit as the virtual images. For example, the image forming unit may be provided near the dashboard of the vehicle, and the virtual image generation device may be provided near the ceiling of the vehicle or formed in the glasses-shape (sunglasses shape).

Embodiments

Preferred embodiments of the present invention will be described below with reference to drawings.

1. Basic Concept

Here, the basic concept of the embodiments will be described.

Figure 16A:
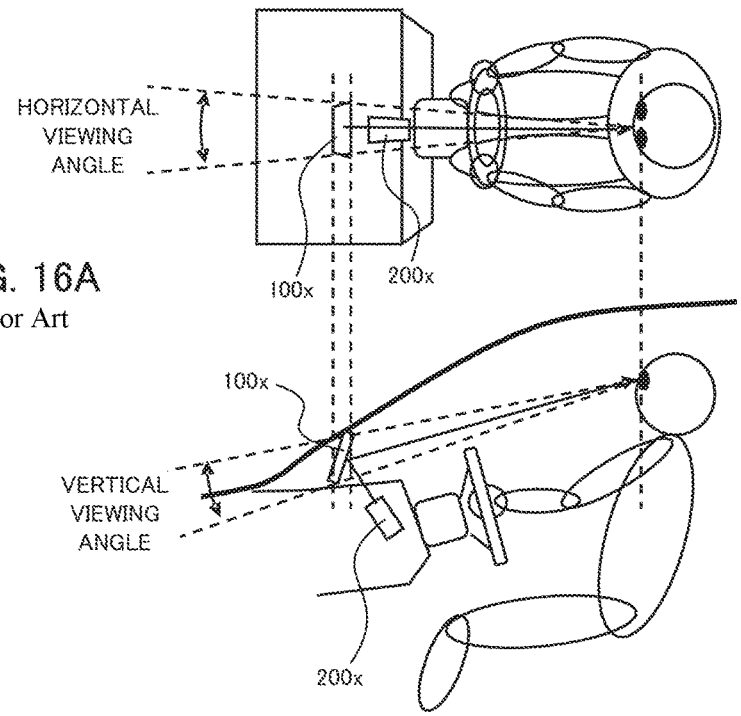
FIGS. 16A and 16B are diagrams for explaining a problem of a general HUD.
Figure 16B:
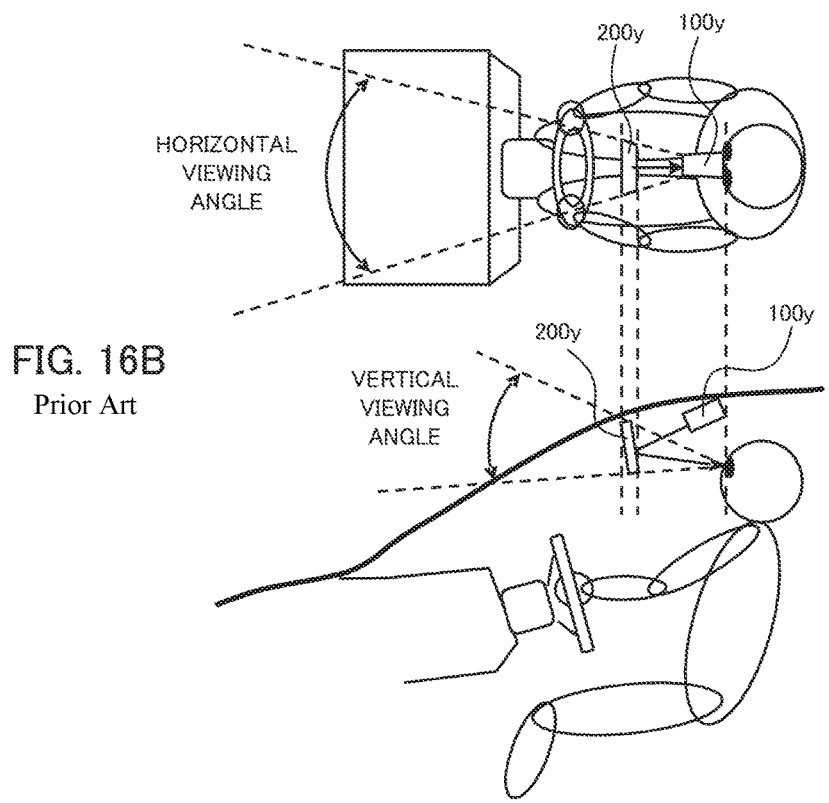

First, a problem of a general HUD will be described with reference to FIGS. 16A and 16B. FIG. 16A illustrates a HUD 300x in which a combiner 100x and a real image display device 200x are arranged on a dashboard, and FIG. 16B illustrates a HUD 300y in which a combiner 100y and a real image display device 200y are arranged near a ceiling (near a sun visor) of a vehicle. The HUDs 300x, 300y make a driver visually recognize the real image formed by the real image display devices 200x, 200y (i.e., an image displayed on an LCD display or an image projected on a screen by a projector) as a virtual image. Thus, the driver can visually recognize meters or navigation information superimposed on a front view while looking ahead without dropping the visual line.

When the size of the combiner is fixed, the maximum viewing angle of the virtual image visually recognized by the driver is determined dependently upon the distance between the combiner and the driver. Namely, the viewing angle becomes large when the combiner is near to the driver, and the viewing angle becomes small when the combiner is far from the driver. Therefore, in order to visualize as large virtual image as possible, it is preferred to position the combiner as close to the driver as possible. However, in terms of the place where the combiner can be set, the combiner 100x is frequently arranged on the dashboard as shown in FIG. 16A.

On the other hand, as shown in FIG. 16B, recently there has been proposed a HUD 300y in which the combiner 100y is mounted near the ceiling (i.e., near the sun visor) so as to enlarge the viewing angle. In this HUD 300y, since the real image display device 200y must be arranged on the driver side with respect to the combiner 100y (to make the reflected light of the real image incident upon eyes), basically it is also necessary to mount the real image display device 200y on the ceiling. Therefore, there are such disadvantages that the driver feels a sense of oppression and that the power lines must be drawn to the ceiling, making the mounting work troublesome.

The embodiments employ a configuration that can solve the above-described problems of the HUD300x, 300y. FIG. 1 illustrates a basic configuration of a HUD 300 according to the embodiments. In the configuration of the embodiments, as shown in FIG. 1, the real image display device 200 is mounted on a dashboard, and only the combiner 100 is mounted near the ceiling (near the sun visor). Also, in order to appropriately realize the above configuration, the embodiments employ a transmission type combiner 100 which transmits the light corresponding to the real image, in place of a reflection type combiner 100x, 100y which reflects the light corresponding to the real image (see FIGS. 16A and 16B). Specifically, the combiner 100 according to the embodiments applies an optical effect only on the light from the real image display device 200 (hereinafter suitably referred to as "real image displaying light") to refract the real image displaying light to be guided to the head of the driver, and does not apply the optical effect on the light other than the real image displaying light (the light corresponding to the front view from the vehicle, hereinafter suitably referred to as "background light") to let the background light pass through.

By the HUD 300 according to the embodiments, the viewing angle of the virtual image visually recognized by the driver can be ensured. Also, in comparison with the HUD 300y shown in FIG. 16B, an oppressive feeling to the driver can be suppressed, and it becomes unnecessary to draw the power line to the ceiling, thereby making the mounting work easy.

The present invention is not limited to the example shown in FIG. 1 in which the real image display device 200 is mounted on the dashboard, and the real image display device 200 may be provided on an instrument panel or a center console. Namely, the present invention is not limited to configure the real image display device in an on-dash type, and the real image display device may be configured in an in-dash type.

The combiner 100 (including the combiners 100a to 100c described later) corresponds to an example of "a virtual image generation device" of the present invention, and the real image display device 200 corresponds to an example of "an image forming unit" of the present invention.

Next, specific examples of the above combiner 100 according to the embodiments will be described below. Specifically, the combiners 100a to 100c according to first to third embodiments will be described. It is noted that the combiners 100a to 100c according to the first to third embodiments are applied to the HUD 300 shown in FIG. 1.

2. First Embodiment

The first embodiment will be described.

2-1. Configuration of Combiner According to First Embodiment

Figure 2:
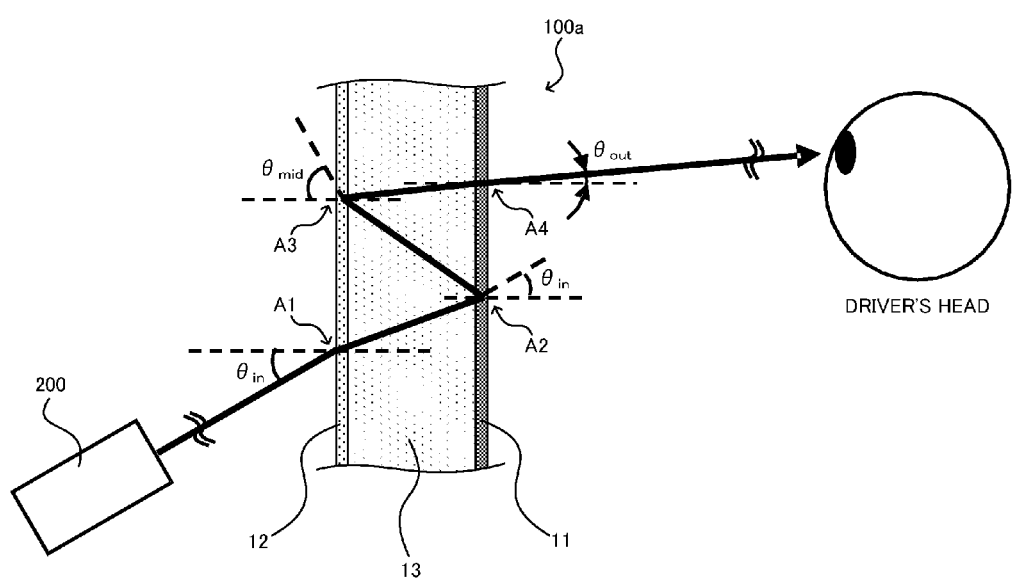
FIG. 2 illustrates a configuration of a combiner according to a first embodiment.

FIG. 2 is a diagram illustrating a configuration of the combiner 100a according to the first embodiment. FIG. 2 illustrates a sectional view of a part of the combiner 100a cut along a traveling direction of the light (the real image displaying light) from the real image display device 200 (it is true of the following figures of the combiners).

As shown in FIG. 2, the combiner 100a according to the first embodiment includes volume type HOEs (Holographic Optical Elements) 11, 12, and a transparent base plate 13. The volume type HOE 11 is formed on the side of the base plate 13 opposite to the side to which the real image displaying light enters, and the volume type HOE 12 is formed on the side of the base plate 13 to which the real image displaying light enters. Since the base plate 13 is formed as a parallel flat plate, i.e., both sides of the base plate 13 are parallel with each other, the volume type HOE 11 and the volume type HOE 12 are arranged in a manner parallel with each other.

The volume type HOE 11 corresponds to "a first optical element" according to the present invention, and the volume type HOE 12 corresponds to "a second optical element" according to the present invention.

In the first embodiment, as shown by the arrows A1 to A4 in FIG. 2, by applying a predetermined optical effect on the real image displaying light by means of the volume type HOEs 11, 12, the real image displaying light entering the combiner 100a from the real image displaying device 200 with an incident angle $\theta_{in}$ exits the combiner 100a with an exit angle $\theta_{out}$ ($\theta_{out} \neq \theta_{in}$) to be guided to the head of the driver.

Specifically, the light entered the combiner 100a from the real image display device 200 with the incident angle $\theta_{in}$ first passes through the volume type HOE 12 as shown by the arrow A1, and is reflected by the volume type HOE 11 as shown by the arrow A2. In this case, due to the characteristic of the volume type HOE 11, the reflection by the volume type HOE 11 becomes the diffraction reflection in which the incident angle $\theta_{in}$ to the volume type HOE 11 is different from the reflection angle $\theta_{mid}$ from the volume type HOE 11. Generally, the volume type HOE has such a characteristic that the incident angle and the reflection angle can be freely set by the diffraction reflection, and hence the volume type HOE 11 is configured such that "the incident angle $\theta_{in}$<reflection angle $\theta_{mid}$" by taking advantage of this characteristic.

Thereafter, the light diffraction-reflected by the volume type HOE 11 is reflected by the volume type HOE 12 as shown by the arrow A3. In this case, due to the characteristic of the volume type HOE 12, the reflection by the volume type HOE 12 becomes the diffraction reflection in which the incident angle $\theta_{mid}$ to the volume type HOE 12 is different from the exit angle $\theta_{out}$ from the volume type HOE 12. The volume type HOE 12 is configured such that "the incident angle $\theta_{mid}$>exit angle $\theta_{out}$" by taking advantage of the above-mentioned characteristic that the incident angle and the reflection angle can be freely set. Thereafter, the light diffraction-reflected by the volume type HOE 12 passes through the volume type HOE 11 as shown by the arrow A4 and exits the combiner 100a with the exit angle $\theta_{out}$.

The incident angle $\theta_{in}$ is determined based on the installation positions of the real image display device 200 and the combiner 100a, and the exit angle $\theta_{out}$ is determined based on the position of the head and the display position of the virtual image. The angle $\theta_{mid}$ (internal waveguide angle) may be freely determined to some extent. In an example, 30 [°] is used as the incident angle $\theta_{in}$, 60 [°] is used as the angle $\theta_{mid}$ (internal waveguide angle), and 5 [°] is used as the exit angle $\theta_{out}$.

Next, with reference to FIGS. 3A and 3B, the description will be given of the characteristics that the volume type HOEs 11, 12 need to have, in order to achieve the optical effect of the volume type HOEs 11, 12 as described above.

Figure 3A:
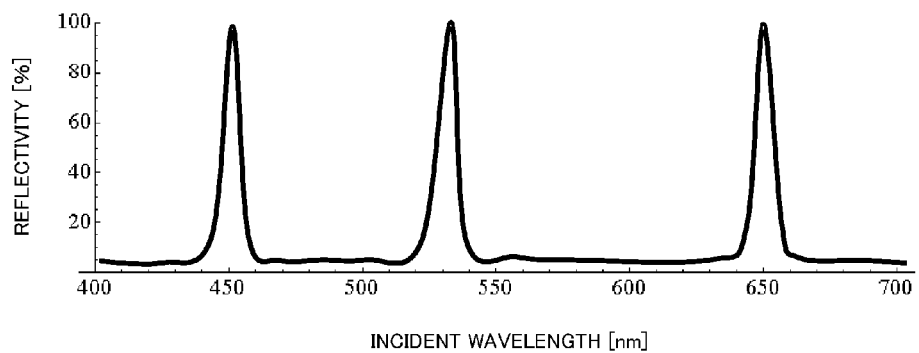
FIGS. 3A and 3B illustrate characteristics of a volume type HOE.

FIG. 3A illustrates wavelength-selective reflection characteristic of the volume type HOE 11 and the volume type HOE 12, wherein the horizontal axis indicates an incident wavelength [nm] and the vertical axis indicates reflectivity [%]. Specifically, FIG. 3A illustrates the wavelength dependence of the reflectivity with respect to the light entering the volume type HOE 11 with the incident angle $\theta_{in}$ and the light entering the volume type HOE 12 with the incident angle $\theta_{mid}$. As shown in FIG. 3A, in the first embodiment, the volume type HOEs 11, 12 are configured such that the optical effect (specifically, the diffraction reflection effect) is given only to the real image displaying light (e.g., the light around the wavelength 450 nm, 532 nm, 650 nm in the real image display device 200 having LEDs of three primary colors). Thereby, the light other than the real image displaying light (i.e., the light having the wavelength other than the above three wavelengths) passes through the combiner 100a without receiving the optical effect of the volume type HOEs 11, 12. Therefore, the background light other than the real image displaying light merely passes through the combiner 100a of parallel flat plate, thereby ensuring the transparency without distortion of the background.

Figure 3B:
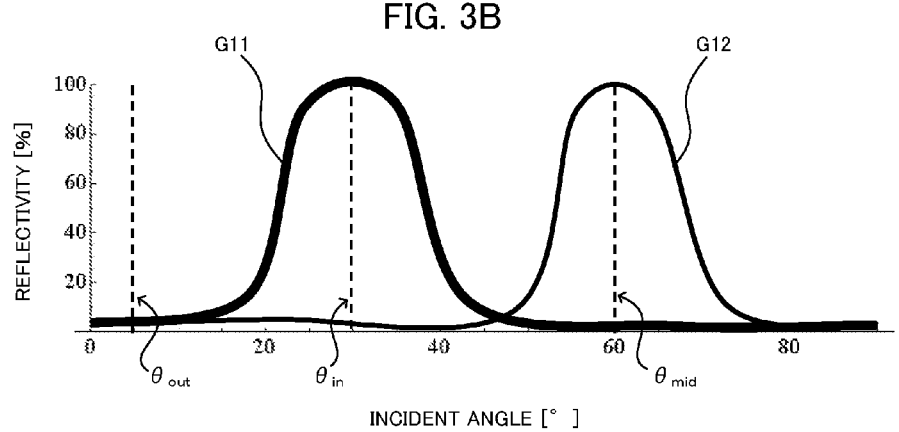

FIG. 3B illustrates the incident angle dependence of the reflectivity of the volume type HOEs 11, 12 with respect to the real image displaying light, wherein the horizontal axis indicates the incident angle [°] (this incident angle is converted to the interface reflection) and the vertical axis indicates the reflectivity [%]. Specifically, the graph G11 of the thick line indicates the incident angle dependence of the volume type HOE 11, and the graph G12 of the thin line indicates the incident angle dependence of the volume type HOE 12. FIG. 3B shows an example in which the incident angle $\theta_{in}$ is 30 [°], the angle $\theta_{mid}$ (internal waveguide angle) is 60 [°] and the exit angle $\theta_{out}$ is 5[°].

As shown in FIG. 3B, in the first embodiment, the volume type HOE 11, 12 are configured to have the incident angle dependency as well as the wavelength selectivity shown in FIG. 3A. Specifically, as shown by the graph G11, the volume type HOE 11 is configured to transmit the light incident with the angle and reflect the light incident with the angle $\theta_{in}$. As shown by the graph G12, the volume type HOE 12 is configured to transmit the light incident with the angle $\theta_{in}$ and reflect the light incident with the angle $\theta_{mid}$. By this, the real image displaying light can be guided as shown by the arrows A1 to A4 in FIG. 2. As a result, only the real image displaying light can reach the head of the driver, with its direction changed by passing through the combiner 100a.

Figure 4A:
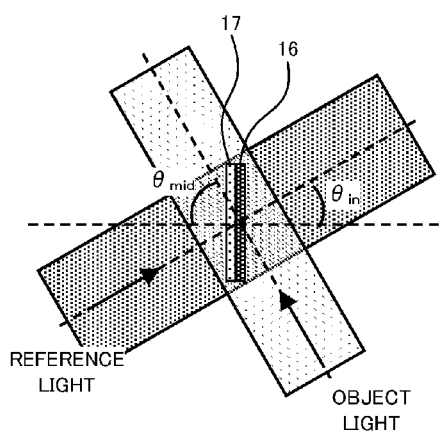
FIGS. 4A and 4B illustrate a manufacturing method of the volume type HOE according to the first embodiment.
Figure 4B:
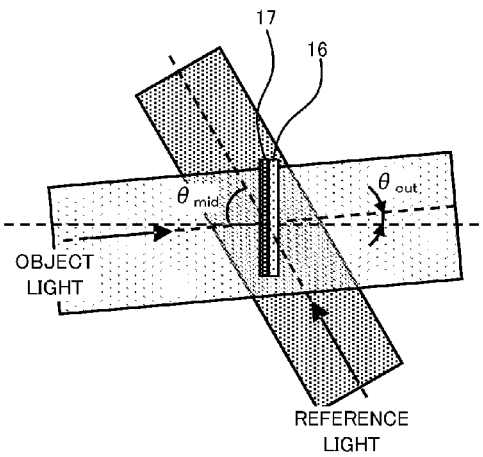

Next, with reference to FIGS. 4A and 4B, a manufacturing method of the volume type HOEs 11, 12 according to the first embodiment will be described. FIG. 4A illustrates an exposure method for producing the volume type HOE 11, and FIG. 4B illustrates an exposure method for producing the volume type HOE 12. As shown in FIG. 4A, the volume type HOE 11 is produced by two-beam interference, which irradiates a reference light (corresponding to the incident light to the combiner 100a) on the hologram medium 16 attached to the base plate 17 with the angle $\theta_{in}$ and irradiates an object light on the hologram medium 16 with the angle $\theta_{mid}$. As shown in FIG. 4B, the volume type HOE 12 is produced by two-beam interference, which irradiates an object light (corresponding to the exit light from the combiner 100a) on the hologram medium 16 attached to the base plate 17 with the angle $\theta_{out}$ and irradiates a reference light on the hologram medium 16 with the angle $\theta_{mid}$. It is noted that FIGS. 4A and 4B illustrate the case in which the parallel lights are used as the reference light and the object light.

Here, description will be given of why the combiner 100a is formed, not by a single volume type HOE, but by two volume type HOEs. Namely, description will be given of the reason why the optical function of the combiner 100a described above cannot be achieved by only one HOE. In order to achieve the transmission-type combiner by only one HOE, it is necessary to use, as the HOE, not a volume type HOE, but a transmission-type HOE giving the optical effect to the transmission light. However, the transmission-type HOE cannot have the wavelength-selectivity as shown in FIG. 3A in principle. Therefore, if the transmission-type combiner is produced by only one transmission-type HOE, the optical effect is given to the light of all wavelength, and hence it is not possible to achieve such an optical function that the background light is passed through as it is and the real image displaying light entering with the incident angle $\theta_{in}$ is outputted with the exit angle $\theta_{out}$. On the other hand, the volume type HOE can have the wavelength selectivity that gives the optical effect only to the light of a certain wavelength, but it is only for the reflected light. Namely, the volume type HOE is a reflection-type HOE giving the optical effect to the reflected light. In order to achieve the transmission-type combiner by using the volume type HOE, it is necessary to arrange not one but two volume type HOEs in a manner opposite to each other. For the above reason, in this embodiment, two volume type HOEs 11, 12 are used to achieve the optical function to diffraction-reflect and transmit the real image displaying light as shown by the arrows A1 to A4 in FIG. 2 to make the real image displaying light incident with the incident angle $\theta_{in}$ exits with the exit angle $\theta_{out}$ and make the background light passes through as it is. It is noted that the above-described reason why two volume type HOEs 11, 12 are used similarly applies to the embodiments described below.

2-2. Modified Examples of First Embodiment

Next, modified examples of the first embodiment will be described. The following modified examples may be implemented in an arbitrary combination.

2-2-1. First Modified Example

Figure 5A:
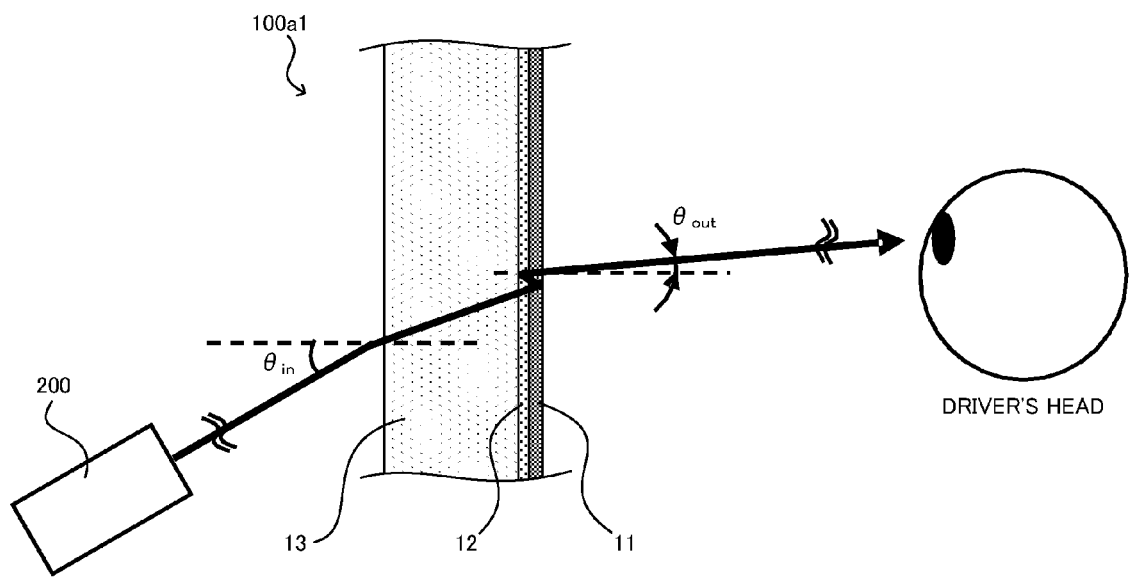
FIGS. 5A and 5B illustrate a configuration of a combiner according to a first modified example of the first embodiment.
Figure 5B:
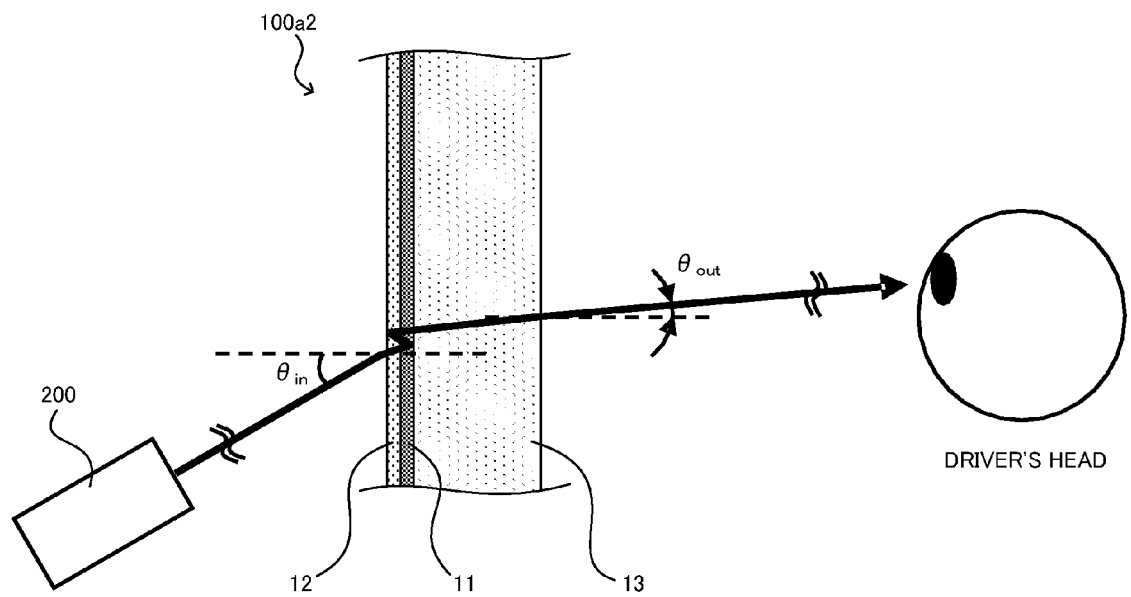

FIGS. 5A and 5B are diagrams illustrating a configuration of a combiner 100a1, 100a2 according to the first modified example of the first embodiment. As shown in FIGS. 5A and 5B, the combiner 100a1, 100a2 according to the first modified example of the first embodiment is different from the combiner 100a according to the first embodiment in that the volume type HOEs 11 and 12 are formed on one side of the base plate 13 (the parallel flat plate) in a stacked manner. In the combiner 100a1 shown in FIG. 5A, the stacked volume type HOEs 11 and 12 are formed on the side of the base plate 13 opposite to the side which the real image displaying light enters. In the combiner 100a2 shown in FIG. 5B, the stacked volume type HOEs 11 and 12 are formed on the side of the base plate 13 which the real image display light enters.

2-2-2. Second Modified Example

In the second modified example of the first embodiment, the combiner 100a further has a lens effect as the optical effect given to the real image displaying light. For example, the combiner 100a has a light collecting function and/or a light diffusion function. Such a combiner 100a can be produced by applying, not the parallel lights, but convergent lights or diffused lights as the reference light (corresponding to the incident light to the combiner 100a) for the exposure of the volume type HOE 11 and the object light (corresponding to the exit light from the combiner 100a) for the exposure of the volume type HOE 12. According to the second modified example of the first embodiment, it is possible to produce the combiner 100a having a magnification, and the distance of the virtual image may be changed to be farther or nearer.

3. Second Embodiment

Next, a second embodiment will be described.

3-1. Configuration of Combiner According to Second Embodiment

Figure 6:
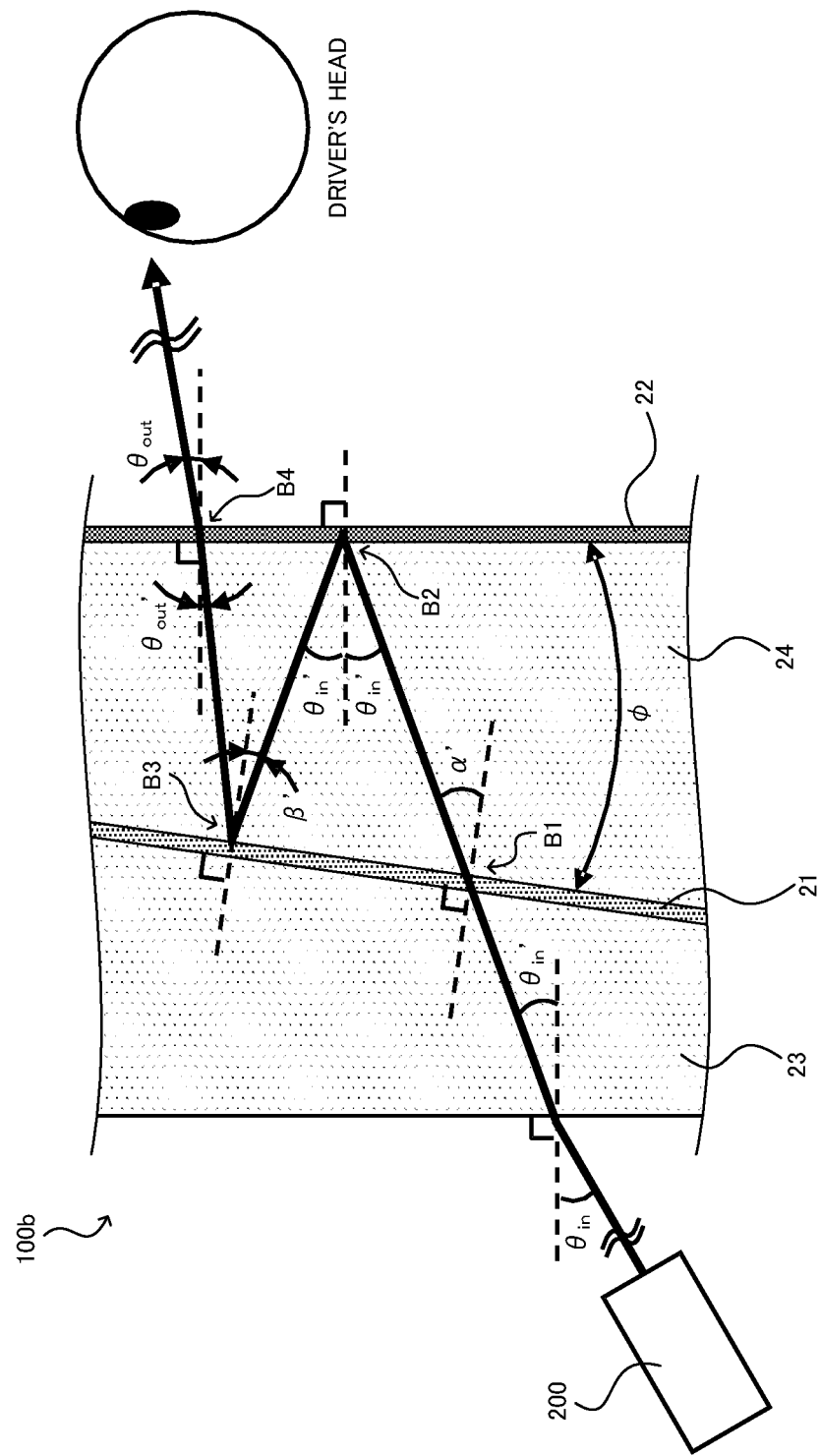
FIG. 6 illustrates a configuration of a combiner according to a second embodiment.

FIG. 6 illustrates a configuration of a combiner 100b according to the second embodiment. As shown in FIG. 6, the combiner 100b according to the second embodiment includes dielectric multilayers 21, 22, and transparent base plates 23, 24. In the combiner 100b, the base plate 23, the dielectric multilayer 21, the base plate 24 and the dielectric multilayer 22 are formed in this order from the side which the real image displaying light enters. Also, in the combiner 100b, the dielectric multilayer 21 and the dielectric multilayer 22 are arranged to be non-parallel with each other. Specifically, the dielectric multilayer 22 is arranged along the horizontal plane in the combiner 100b, and the dielectric multilayer 21 is arranged to be inclined by the angle φ with respect to the horizontal plane in the combiner 100b.

Namely, the dielectric multilayer 21 and the dielectric multilayer 22 form the angle "φ".

Also in the second embodiment, as indicated by the arrows B1 to B4 in FIG. 6, by applying a predetermined optical effect on the real image displaying light by means of the dielectric multilayers 21, 22, the real image displaying light entering the combiner 100b from the real image displaying device 200 with an incident angle $\theta_{in}$ exits the combiner 100b with an exit angle $\theta_{out}$ ($\theta_{out} \neq \theta_{in}$) to be guided to the head of the driver.

Specifically, the light entered the combiner 100b from the real image display device 200 with the incident angle $\theta_{in}$ is refracted by the base plate 23 to have the angle $\theta_{in}'$, and passes through the dielectric multilayer 21 to exit with the exit angle $\alpha'$ as shown by the arrow B1. Then, the light passed through the dielectric multilayer 21 is regularly reflected by the dielectric multilayer 22 as shown by the arrow B2. Specifically, the light passed through the dielectric multilayer 21 enters the dielectric multilayer 22 with the incident angle $\theta_{in}$ and is reflected by the dielectric multilayer 22 with the reflection angle $\theta_{in}'$. Then, the light regularly reflected by the dielectric multilayer 22 is further regularly reflected by the dielectric multilayer 21 as shown by the arrow B3. Specifically, the light reflected by the dielectric multilayer 22 enters the dielectric multilayer 21 with the incident angle $\beta'$ and is reflected by the dielectric multilayer 21 with the reflection angle $\beta'$. Thereafter, the light reflected by the dielectric multilayer 21 enters the dielectric multilayer 22 with the incident angle $\theta_{out}'$ and passes through the dielectric multilayer 22 to exit the combiner 100b with the exit angle $\theta_{out}$.

Here, the incident angle $\theta_{in}$ is determined based on the arrangement positions of the real image display device 200 and the combiner 100b, and the exit angle $\theta_{out}$ is determined based on the positions of the head and the display position of the virtual image. The angles $\theta_{in}'$, $\theta_{out}'$ correspond to the angles $\theta_{in}$, $\theta_{out}$ inside the base plate, respectively, and are obtained from the equations (1) and (2) by the Snell's law.

$$\theta_{in}'=\sin^{-1}(\sin \theta_{in}/n) \quad (1)$$

$$\theta_{out}'=\sin^{-1}(\sin \theta_{out}/n) \quad (2)$$

Also, the above angles $\alpha'$, $\beta'$, $\varphi$ are expressed by the equations (3), (4), (5), respectively, by using the angles $\theta_{in}'$, $\theta_{out}'$.

$$\alpha'=(3\theta_{in}'-\theta_{out}')/2 \quad (3)$$

$$\beta'=(\theta_{in}'+\theta_{out}')/2 \quad (4)$$

$$\varphi=(\theta_{in}'-\theta_{out}')/2 \quad (5)$$

Further, the angles $\alpha'$, $\beta'$ are converted to the angles $\alpha$, $\beta$ in the air by the Snell's law, as expressed by the equations (6), (7).

$$\alpha=\sin^{-1}(n \cdot \sin \alpha') \quad (6)$$

$$\beta=\sin^{-1}(n \cdot \sin \beta') \quad (7)$$

In an example wherein the angle $\theta_{in}$ is 30 [°] and the angle $\theta_{out}$ is 10 [°], the angles $\theta_{in}'$, $\theta_{out}'$ are obtained from the equations (1) and (2), "$\alpha' \approx 25.9$ [°]" is obtained by substituting the angles $\theta_{in}'$, $\theta_{out}'$ for the equation (3), and "$\beta' \approx 13.1$ [°]" is obtained by substituting the angles $\theta_{in}'$, $\theta_{out}'$ for the equation (4). Then, "$\alpha \approx 40.9$ [°]" is obtained by substituting the angle $\alpha'$ for the equation (6), and "19.8 [°]" is obtained by substituting the angle $\beta'$ for the equation (7). Further, "$\varphi \approx 6.4$ [°]" is obtained by substituting the angles $\theta_{in}'$, $\theta_{out}'$ for the equation (5). Therefore, in the above example, it is necessary to arrange the dielectric multilayer 21 to be inclined by 6.4 [°] with respect to the dielectric multilayer 22.

Next, with reference to FIGS. 7A and 7B, description will be given of the characteristics that the dielectric multilayers 21, 22 need to have, in order to realize the above-described optical effect of the dielectric multilayers 21, 22.

Figure 7A:
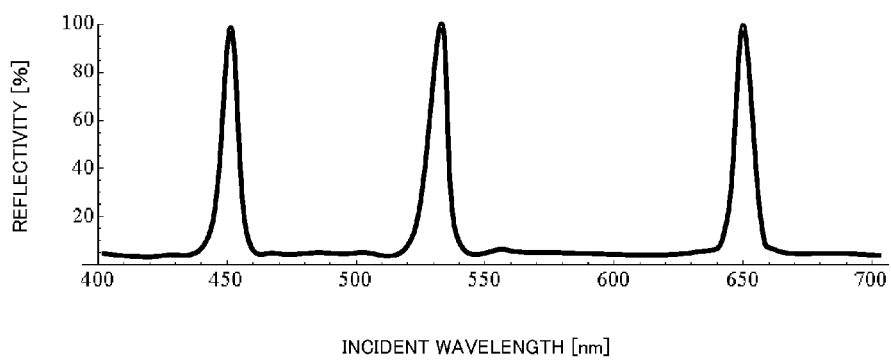
FIGS. 7A and 7B illustrate characteristics of a dielectric multilayer according to the second embodiment.

FIG. 7A illustrates wavelength-selective reflection characteristic of the dielectric multilayer 21 and the dielectric multilayer 22, wherein the horizontal axis indicates an incident wavelength [nm] and the vertical axis indicates reflectivity [%]. Specifically, FIG. 7A illustrates the wavelength-dependence of the reflectivity with respect to the light entering the dielectric multilayer 21 with the incident angle $\beta$ ($\beta'$ inside the base plate) and the light entering the dielectric multilayer 22 with the incident angle $\theta_{in}$ ($\theta_{in}'$ inside the base plate). As shown in FIG. 7A, in the second embodiment, the dielectric multilayers 21, 22 are configured to give the optical effect (specifically, the regular reflection effect) only to the real image displaying light (e.g., the lights of the wavelength near 450 nm, 532 nm, 650 nm in case of the real image display device 200 configured by three primary color LED). Thus, the light other than the real image displaying light (the light having the wavelength other than the above three wavelengths) passes through the combiner 100b without receiving the optical effect by the dielectric multilayers 21, 22. Therefore, the background light, which is the light other than the real image displaying light, merely passes through the combiner 100b of the parallel flat plate, and it is possible to ensure the transparency without distortion of the background.

Figure 7B:
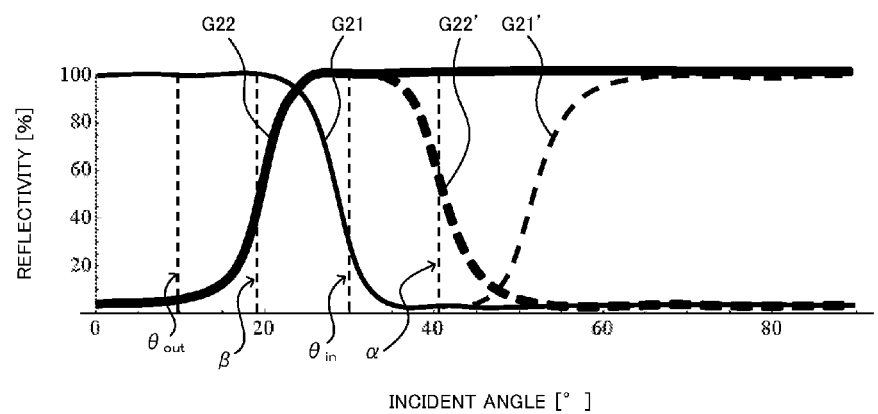

FIG. 7B illustrates incident angle dependencies of reflectivity of the dielectric multilayers 21, 22 with respect to the real image displaying light, wherein the horizontal axis indicates an incident angle [°] (this incident angle indicates the angle converted to the interface reflection with the air) and the vertical axis indicates reflectivity [%]. Specifically, the graph G21 of thin line indicates the incident angle dependence of the dielectric multilayer 21, and the graph G22 of the thick line indicates the incident angle dependence of the dielectric multilayer 22. It is noted that FIG. 7B shows the example wherein the incident angle $\theta_{in}$ is 30 [°], the exit angle $\theta_{out}$ is 10 [°], the angle $\alpha$ is 40.9 [°] and the angle $\beta$ is 19.8 [°].

As shown by the graph G21, the dielectric multilayer 21 is formed to transmit the light entering with the angle $\alpha$ and reflect the light entering with the angle $\beta$. Also, as shown by the graph G22, the dielectric multilayer 22 is formed to transmit the light entering with the angle $\theta_{out}$ and reflect the light entering with the angle $\theta_{in}$. Thus, the real image displaying light can be guided as shown by the arrows B1 to B4 in FIG. 6. As a result, only the real image displaying light passes through the combiner 100b and changes its direction, thereby to reach the head of the driver.

If the dielectric multilayer 21 has the characteristic of transmitting the light entering with the angle $\alpha$ and reflecting the light entering with the angle $\beta$, it may have any characteristic at other angles. For example, the dielectric multilayer 21 may have the characteristic shown by the broken-line graph G21'. Similarly, if the dielectric multilayer 22 has the characteristic of transmitting the light entering with the angle $\theta_{out}$ and reflecting the light entering with the angle $\theta_{in}$, it may have any characteristic at other angles. For example, the dielectric multilayer 22 may have the characteristic shown by the broken-line graph G22'.

Since the volume type HOEs 11, 12 described in the first embodiment can diffraction-reflect the light (namely, the incident angle and the reflection angle may be freely set), it is not necessary to intentionally tilt one of the volume type HOEs 11, 12 in order to achieve the optical function of outputting the light incident with the incident angle $\theta_{in}$ with the exit angle $\theta_{out}$ different from the incident angle $\theta_{in}$. Therefore, the volume type HOE 11 and the volume type HOE 12 are arranged in parallel with each other. In contrast, since the dielectric multilayer 21, 22 according to the second embodiment regularly reflect the light (namely, the incident angle and the reflection angle become equal, i.e., the incident angle and the reflection angle cannot be freely set), the dielectric multilayer 21 is tilted with respect to the dielectric multilayer 22 in order to achieve the optical function of outputting the light incident with the incident angle $\theta_{in}$ with the exit angle $\theta_{out}$ different from the incident angle $\theta_{in}$.

3-2. Modified Examples of Second Embodiment

Next, modified examples of the second embodiment will be described. The following modified examples may be implemented in an arbitrary combination.

3-2-1. First Modified Example

FIG. 8 is a diagram illustrating a configuration of a combiner 100b1 according to the first modified example of the second embodiment. As shown in FIG. 8, the combiner 100b1 according to the first modified example of the second embodiment is different from the combiner 100b according to the second embodiment in that it uses a dielectric multilayer 21a of a serrate shape, instead of the dielectric multilayer 21. When the dielectric multilayer 21a is formed into the serrate shape, the dielectric multilayer 21a has a plurality of inclined planes 21a1, and thereby the same function as the above-described dielectric multilayer 21 may be realized. For example, the inclination of the inclined planes 21a1 of the dielectric multilayer 21a may be set to the same inclination as the dielectric multilayer 21. Namely, the inclined planes 21a1 inclined by the angle φ with respect to the dielectric multilayer 22 may be applied.

According to the first modified example of the second embodiment as described above, by using the dielectric multilayer 21a which itself is not inclined, instead of the dielectric multilayer 21 inclined in its entirety, the thickness of the combiner 100b1 can be made thinner than the thickness of the combiner 100b described above.

3-2-2. Second Modified Example

In the second modified example of the second embodiment, the above-described combiner 100b further has a lens effect as the optical effect given to the real image displaying light. For example, the combiner 100b has a focusing function and/or a diffusion function of the light. Such a combiner 100b may be realized by forming the dielectric multilayer 21 (the reflection plane existing inside the base plate) into a moderately curved surface. According to the second modified example of the second embodiment as described above, the combiner 100b having a magnification can be realized, and the distance of the virtual image may be changed far or near.

It is noted that the first modified example may be applied to the dielectric multilayer 21 formed with the moderately curved surface as described above. Namely, the dielectric multilayer 21 may be formed into the curved surface and into the serrate shape at the same time. In that case, the dielectric multilayer 21 may be of a Fresnel lens shape.

3-2-3. Third Modified Example

FIG. 9 is a diagram illustrating a configuration of a combiner 100b2 according to the third modified example of the second embodiment. As shown in FIG. 9, the combiner 100b2 according to the third modified example of the second embodiment is different from the combiner 100b according to the second embodiment in that the dielectric multilayer 21b corresponding to the dielectric multilayer 21 is formed on the surface of the combiner 100b2 and the dielectric multilayer 22b corresponding to the dielectric multilayer 22b corresponding to the dielectric multilayer 22 is formed inside the combiner 100b2. Specifically, in the combiner 100b2, the dielectric multilayer 21b is arranged along the horizontal plane in the combiner 100b2 while the dielectric multilayer 22b is arranged to be inclined by the angle φ with respect to the horizontal plane in the combiner 100b2.

The third modified example may be implemented in combination with the first modified example and/or the second modified example. Namely, the dielectric multilayer 22b may be formed into the curved surface or the serrate shape. When the dielectric multilayer 22b is formed into the curved surface and the serrate shape at the same time, the dielectric multilayer 22b becomes the Fresnel lens shape.

In another example, both the dielectric multilayer 21 and the dielectric multilayer 22 may be formed inside the combiner 100b. In that case, it is not limited that only one of the dielectric multilayer 21 and the dielectric multilayer 22 is formed to be inclined with respect to the horizontal plane of the combiner 100b, and both the dielectric multilayer 21 and the dielectric multilayer 22 may be formed to be inclined with respect to the horizontal plane of the combiner 100b. In addition, the first modified example and/or the second modified example may be applied to one of or both of the dielectric multilayer 21 and the dielectric multilayer 22.

3-2-4. Fourth Modified Example

In the fourth modified example of the second embodiment, two volume type HOEs are used instead of the dielectric multilayers 21, 22. In that case, the volume type HOEs need to have the characteristic as shown in FIGS. 7A and 7B. Additionally, the volume type HOEs need to be formed to give the regular reflection effect to the real image displaying light as the optical effect.

The fourth modified example may be implemented in combination with at least one of the first to third modified examples. In that case, if the volume type HOEs need to have the lens effect, it is preferred that the volume type HOEs are not formed by the curved surface, but the volume type HOEs formed by the method described in the second modified example of the first embodiment are used.

3-2-5. Fifth Modified Example

In the second embodiment described above, while the dielectric multilayer is used as the wavelength selective transmission layer or the wavelength selective reflection layer, the wavelength selective transmission layers or the wavelength selective reflection layer of various kind, other than the dielectric multilayer, may be used.

4. Third Embodiment

Next, the third embodiment will be described.

4-1. Configuration of Combiner according to Third Embodiment

Figure 10:
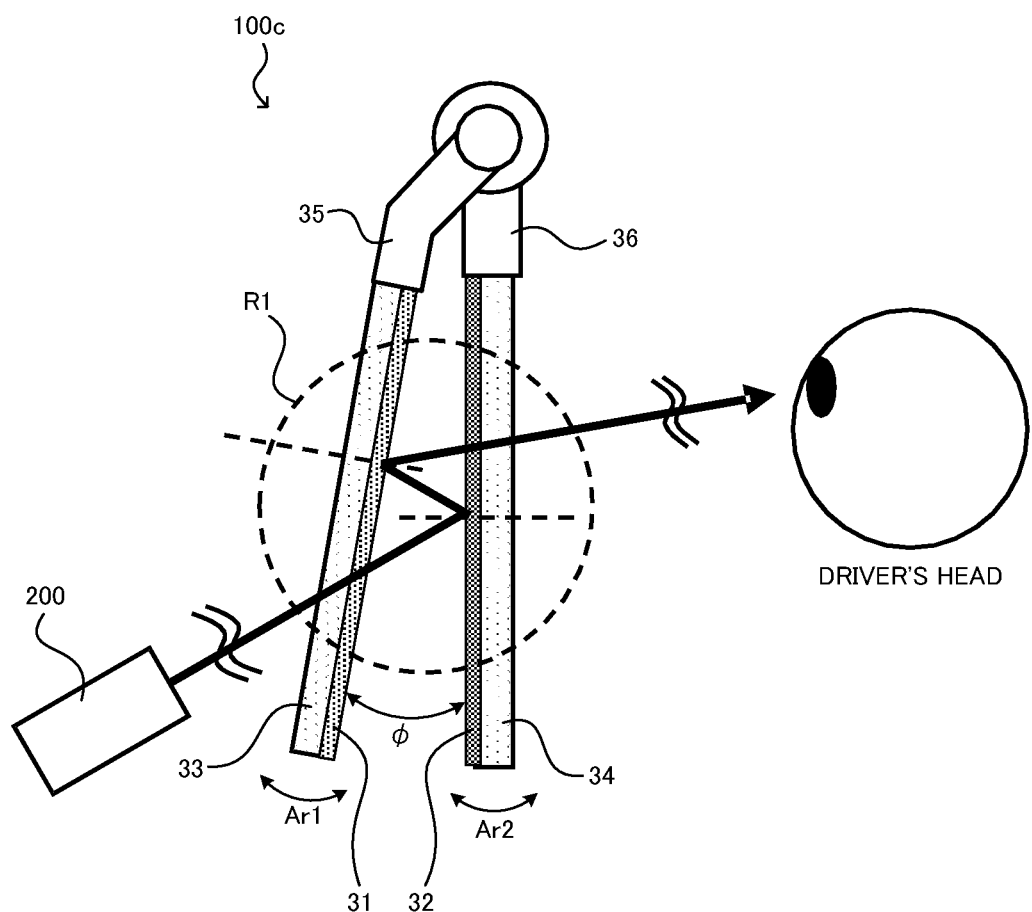
FIG. 10 illustrates a configuration of a combiner according to a third embodiment.

FIG. 10 is a diagram illustrating a configuration of a combiner 100c according to the third embodiment. As shown in FIG. 10, the combiner 100c according to the third embodiment includes dielectric multilayers 31, 32, transparent base plates 33, 34, and holding parts 35, 36. The dielectric multilayer 31 is formed on the side of the base plate 33 opposite to the side which the real image displaying light enters, and the dielectric multilayer 32 is formed on the side of the base plate 34 which the real image displaying light enters. The base plates 33, 34 are formed as parallel flat plates.

The dielectric multilayer 31 and the base plate 33 are held by the holding part 35, and the dielectric multilayer 32 and the base plate 34 are held by the holding part 36. The holding part 35 and the holding part 36 are attached in a manner rotatable around a common axis. Thus, the dielectric multilayer 31 and the base plate 33 held by the holding part 35 swings in the direction shown by the arrow Ar1, and the dielectric multilayer 32 and the base plate 34 held by the holding part 36 swings in the direction shown by the arrow Ar2. Therefore, the angle $\varphi$ formed by the dielectric multilayer 31 and the dielectric multilayer 32 may be suitably changed.

It is not limited that the combiner 100c is configured such that both the dielectric multilayer 31 and the dielectric multilayer 32 swing. The combiner 100c may be configured such that one of the dielectric multilayer 31 and the dielectric multilayer 32 is fixed and only the other of the dielectric multilayer 31 and the dielectric multilayer 32 swings.

Figure 11:
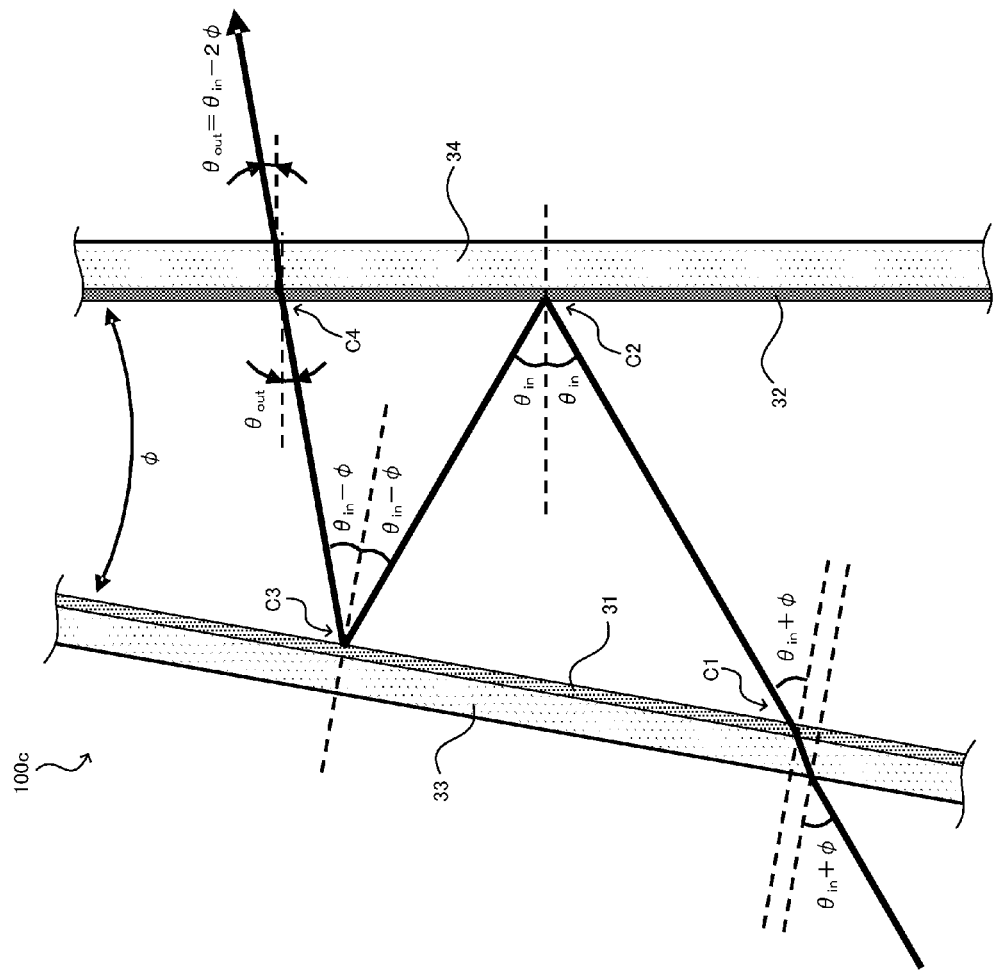
FIG. 11 illustrates the combiner according to the third embodiment, with magnifying a broken line area in FIG. 10.

FIG. 11 is a diagram of the combiner 100c according to the third embodiment, illustrating a magnified view of the broken line area R1 in FIG. 10. Also in the third embodiment, as shown by the arrows C1 to C4 in FIG. 11, the dielectric multilayers 31, 32 give a predetermined optical effect to the real image displaying light to make the real image displaying light entering the combiner 100c from the real image display device 200 with the incident angle "$\theta_{in}+\varphi$" exit the combiner 100c with the exit angle "$\theta_{out}$" to be guided to the head of the driver.

Specifically, the light entering the combiner 100c from the real image display device 200 with the incident angle "$\theta_{in}+\varphi$" passes through the dielectric multilayer 31 as shown by the arrow C1, and is regularly reflected by the dielectric multilayer 32 as shown by the arrow C2. In this case, the light passed through the dielectric multilayer 31 enters the dielectric multilayer 32 with the incident angle "$\theta_{in}$", and is reflected by the dielectric multilayer 32 with the reflection angle "$\theta_{in}$". Then, the light reflected by the dielectric multilayer 32 is further regularly reflected by the dielectric multilayer 31 as shown by the arrow C3. In this case, the light reflected by the dielectric multilayer 32 enters the dielectric multilayer 31 with the incident angle "$\theta_{in}-\varphi$", and is reflected by the dielectric multilayer 31 with the reflection angle "$\theta_{in}-\varphi$". Then, the light reflected by the dielectric multilayer 31 passes through the dielectric multilayer 32 as shown by the arrow C4 and exit the combiner 100c with the exit angle $\theta_{out}$ ($\theta_{out}=\theta_{in}-2\varphi$).

In one example, "10±5 [°]" is used as the angle $\varphi$, "40±5 [°]" is used as the incident angle "$\theta_{in}+\varphi$" ($\theta_{in}=30$ [°] in this case), and "10±10 [°]" is used as the exit angle $\theta_{out}$.

Next, with reference to FIGS. 12A and 12B, the description will be given of the characteristic that the dielectric multilayers 31, 32 need to have, in order to realize the optical effect of the dielectric multilayers 31, 32 as described above.

Figure 12A:
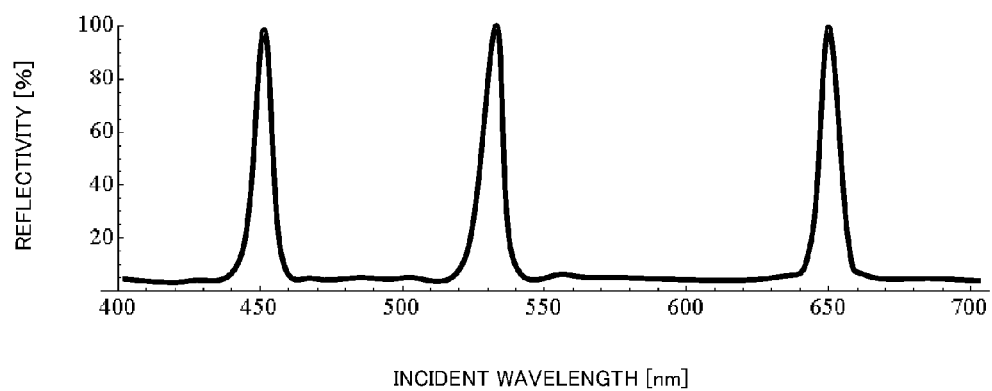
FIGS. 12A and 12B illustrate characteristics of a dielectric multilayer according to the third embodiment.

FIG. 12A illustrates a wavelength-selective reflection characteristic of the dielectric multilayer 31 and the dielectric multilayer 32, wherein the horizontal axis indicates the incident wavelength [nm] and the vertical axis indicates the reflectivity [%]. Specifically, FIG. 12A illustrates the wavelength selectivity of the reflectivity with respect to the light entering the dielectric multilayer 31 with the incident angle "$\theta_{in}-\varphi$" and the light entering the dielectric multilayer 32 with the incident angle $\theta_{in}$. As shown in FIG. 12A, in the third embodiment, the dielectric multilayers 31, 32 are formed to give the optical effect (specifically, the regular reflection effect) only to the real image displaying light (e.g., the light of wavelength near 450, 532, 650 nm in the case of three primary color LED). Thus, the light other than the real image displaying light (the light other than the above three wavelengths) passes through the combiner 100c without receiving the optical effect by the dielectric multilayers 31, 32. Therefore, since the background light, which is the light other than the real image displaying light, merely passes through the combiner 100c of a flat parallel plate, the background is not distorted and the transparency can be ensured.

Figure 12B:
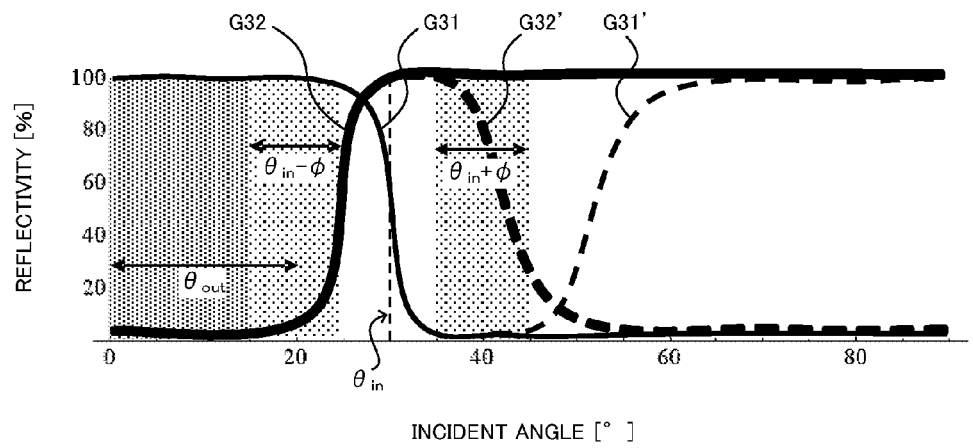

FIG. 12B illustrates an incident angle dependence of the reflectivity of the dielectric multilayer 31 and the dielectric multilayer 32 with respect to the real image displaying light, wherein the horizontal axis indicates the incident angle [°] and the vertical axis indicates the reflectivity [%]. Specifically, the graph G31 of the thin line indicates the incident angle dependence of the dielectric multilayer 31, and the graph G32 of the thick line indicates the incident angle dependency of the dielectric multilayer 32. FIG. 12B shows an example, wherein the angle $\varphi$ is "10±5 [°]", the angle "$\theta_{in}$" is 30 [°], the angle "$\theta_{in}+\varphi$" is "40±5 [°]", the angle "$\theta_{in}-\varphi$" is "20±5 [°]", and the angle "$\theta_{out}$" is "10±10 [°]".

As shown by the graph G31, the dielectric multilayer 31 is formed to transmit the light entering with the angle "$\theta_{in}+\varphi$" and reflects the light entering with the angle "$\theta_{in}-\varphi$". As shown by the graph G32, the dielectric multilayer 32 is formed to transmit the light entering with the angle $\theta_{out}$ and reflect the light entering with the angle $\theta_{in}$. Thus, the real image displaying light can be guided as shown by the arrows C1 to C4 in FIG. 11. As a result, only the real image displaying light passes through the combiner 100c and its direction is changed to reach the head of the driver.

Preferably, the characteristics of the dielectric multilayers 31, 32 shown in FIG. 12B is set in consideration of the possible range of the angle $\varphi$ between the dielectric multilayer 31 and the dielectric multilayer 32.

If the dielectric multilayer 31 has the characteristic of transmitting the light entering with the angle "$\theta_{in}+\varphi$" and reflecting the light entering with the angle "$\theta_{in}-\varphi$", it may have any characteristic at other angles. For example, the dielectric multilayer 31 may have the characteristic shown by the broken-line graph G31'. Similarly, if the dielectric multilayer 32 has the characteristic of transmitting the light entering with the angle $\theta_{out}$ and reflecting the light entering with the angle $\theta_{in}$, it may have any characteristic at other angles. For example, the dielectric multilayer 32 may have the characteristic shown by the broken-line graph G32'.

In the configuration of the first embodiment and the second embodiment described above, the angle formed by the angle $\theta_{in}$ and the angle $\theta_{out}$ cannot be changed even if the mounting angle (tilt angle) of the combiner 100a, 100b itself. Therefore, if the seating height of the driver changes, the light from the real image display device 200 does not appropriately reach the head of the driver. In contrast, since the combiner 100c according to the third embodiment is formed to be able to change the angle $\varphi$ between the dielectric multilayer 31 and the dielectric multilayer 32, the exit angle $\theta_{out}$ becomes "$\theta_{out}=\theta_{in}-2\varphi$". Therefore, the difference of the seating height of the drivers can be absorbed by changing the angle $\varphi$. Namely, according to the third embodiment, the light from the real image display device 200 can appropriately reach the head of the driver even if the seating height of the driver changes. Also, since the member (the flat parallel plate) formed by the dielectric multilayer 31 and the base plate 33 and the member (the flat parallel plate)

formed by the dielectric multilayer 32 and the base plate 34 can be made thin in the third embodiment, the weight of the combiner 100c itself can be reduced in comparison with the second embodiment.

4-2. Modified Examples of Third Embodiment

Next, modified examples of the third embodiment will be described. The following modified examples may be implemented in an arbitrary combination.

4-2-1. First Modified Example

Figure 13A:
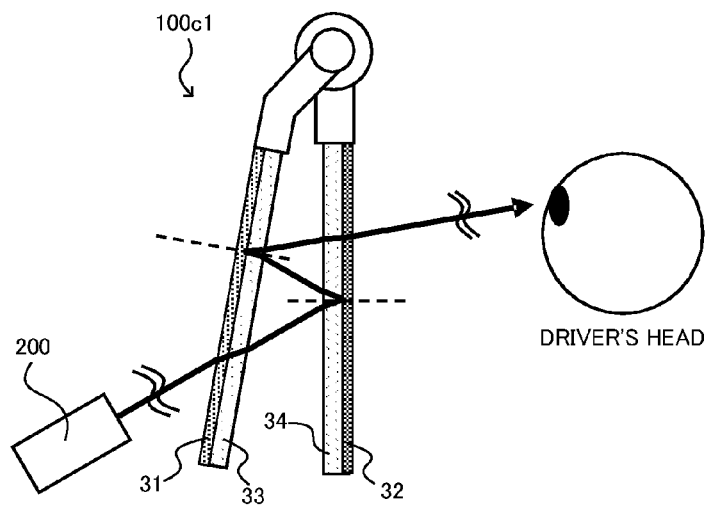
FIGS. 13A to 13C illustrate configurations of a combiner according to a first modified examples of the third embodiment.
Figure 13B:
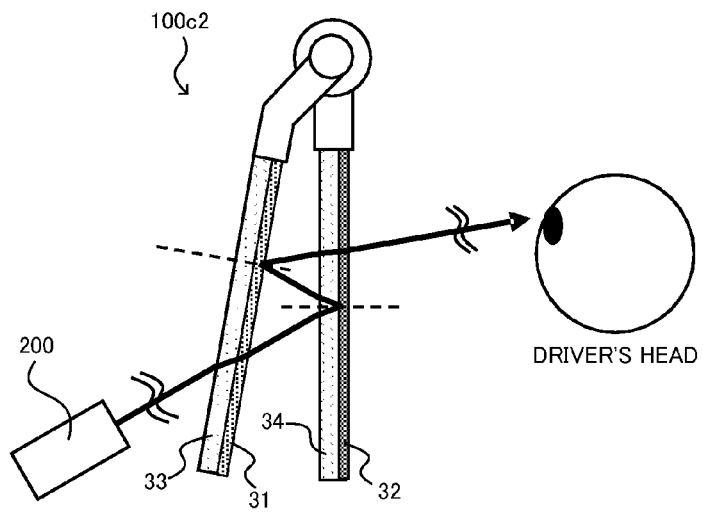
Figure 13C:
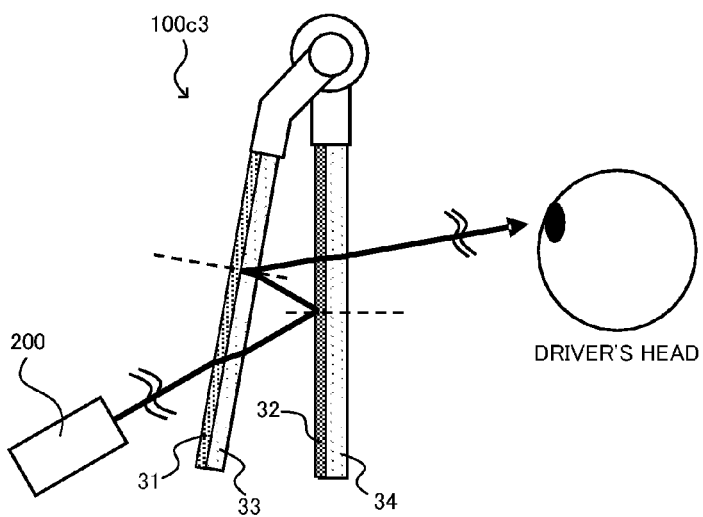

FIGS. 13A to 13C are diagrams illustrating configuration of combiners 100c1 to 100c3 according to the first modified example of the third embodiment. As shown in FIGS. 13A to 13C, the combiners 100c1 to 100c3 according to the first modified example of the third embodiment is different from the combiner 100c according to the third embodiment in the positions on the base plate 33, 34 where the dielectric multilayers 31, 32 are formed.

In the combiner 100c1 shown in FIG. 13A, the dielectric multilayer 31 is formed on the side of the base plate 33 which the real image displaying light enters, and the dielectric multilayer 32 is formed on the side of the base plate 34 opposite to the side which the real image displaying light enters. In the combiner 100c2 shown in FIG. 13B, the dielectric multilayer 31 is formed on the side of the base plate 33 opposite to the side which the real image displaying light enters, and the dielectric multilayer 32 is formed on the side of the base plate 34 opposite to the side which the real image displaying light enters. In the combiner 100c3 shown in FIG. 13C, the dielectric multilayer 31 is formed on the side of the base plate 33 which the real image displaying light enters, and the dielectric multilayer 32 is formed on the side of the base plate 34 which the real image displaying light enters.

4-2-2. Second Modified Example

Figure 14:
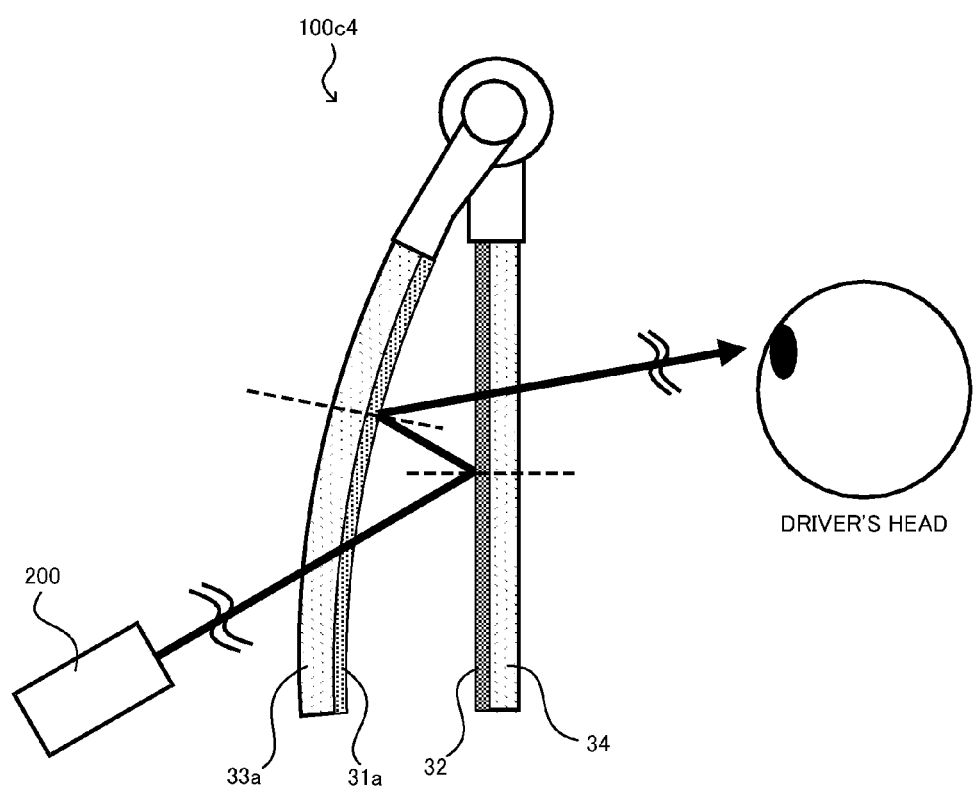
FIG. 14 illustrates a configuration of a combiner according to a second modified example of the third embodiment.
Figure 15:
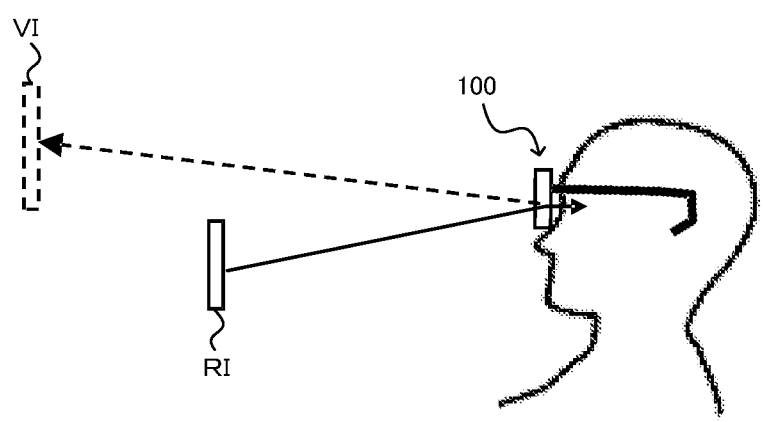
FIG. 15 illustrates an example of a glasses-type combiner.

FIG. 14 is a diagram illustrating a configuration of a combiner 100c4 according to the second modified example of the third embodiment. As shown in FIG. 14, the combiner 100c4 according to the second modified example of the third embodiment is different from the combiner 100c according to the third embodiment in that the dielectric multilayer 31a having a gentle curvature shape (meniscus shape) is used instead of the dielectric multilayer 31 formed in the flat parallel plate. In case of using such a dielectric multilayer 31a, the base plate 33a to which the dielectric multilayer 31a is attached is formed into the shape having a gentle curvature.

According to the combiner 100c4, in addition to the optical effect of the above-described combiner 100c, it is possible to further give the lens effect to the real image displaying light. Therefore, according to the second modified example of the third embodiment, the combiner 100c4 having a magnification can be realized, and the distance of the virtual image may be changed far or near.

Instead of the dielectric multilayer 31, the dielectric multilayer 32 may be formed to have a gentle curvature, and both the dielectric multilayer 31 and the dielectric multilayer 32 may be formed to have a gentle curvature.

Further, the second modified example and the first modified example may be implemented in combination.

4-2-3. Third Modified Example

In the third modified example of the third embodiment, two volume type HOEs are used instead of the dielectric multilayers 31, 32. In that case, the volume type HOEs need to have the characteristic as shown in FIGS. 12A and 12B. Additionally, the volume type HOEs need to be formed to give the regular reflection effect to the real image displaying light as the optical effect.

The third modified example may be implemented in combination with the first modified example and/or the second modified example. In that case, if the volume type HOEs need to have the lens effect, it is preferred that the volume type HOEs are not formed by the curved surface, but the volume type HOEs formed by the method described in the second modified example of the first embodiment are used.

4-2-4. Fourth Modified Example

In the third embodiment described above, while the dielectric multilayer is used as the wavelength selective transmission layer or the wavelength selective reflection layer, the wavelength selective transmission layers or the wavelength selective reflection layer of various kind, other than the dielectric multilayer, may be used.

5. Other Modified Examples

The above-described embodiments recite an example of using the volume type HOEs as the first optical element and the second optical element and an example of using the dielectric multilayers as the first optical element and the second optical element. Instead, the volume type HOE may be used as one of the first optical element and the second optical element, and the dielectric multilayer may be used as the other of the first optical element and the second optical element. Further, the volume type HOE or the dielectric multilayer may be used as one of the first optical element and the second optical element, and an optical element other than the volume type HOE and the dielectric multilayer may be used as the other one of the first optical element and the second optical element.

6. Application Example

While the combiner 100 is provided near the ceiling of the vehicle in the embodiments described above, the combiner 100 may be of glasses-type (sunglasses type).

While the above embodiments described the examples of applying the present invention to the HUD, the application of the present invention is not limited to this. The present invention may be applied to various display devices which visualizes the image as the virtual image. For example, the present invention is applicable to a head mount display.

DESCRIPTION OF REFERENCE NUMBERS

11, 12 Volume type HOE
12, 23, 24, 33, 34 Base plate
21, 22, 31, 32 Dielectric multilayer
35, 36 Holding part
100, 100a, 100b, 100c Combiner
200 Real image display device
300 HUD

The invention claimed is:

1. A virtual image generation device which visualizes images formed by an image forming unit as virtual images, comprising:
   a first optical element disposed along a travelling direction of an image light corresponding to the images and arranged on a side of an observer who visually recognizes the virtual images, and
   a second optical element disposed opposite to the first optical element and arranged on a side of the image forming unit,
   wherein the first optical element and the second optical element have a characteristic of reflecting or transmitting the light having a wavelength corresponding to the image light in accordance with an incident angle of the light, wherein the second optical element transmits the incident image light toward the first optical element, and reflects the image light incident after being reflected by the first optical element toward the first optical element, wherein the first optical element reflects the image light incident after passing through the second optical element toward the second optical element, and transmits the image light incident after being reflected by the second optical element toward the observer, and wherein the first optical element and the second optical element are configured such that an angle formed by the first optical element and the second optical element is variable.

2. The virtual image generation device according to claim 1, wherein the second optical element has a characteristic of transmitting the image light having a first angle as the incident angle, the first angle being an angle with which the image light from the image forming unit enters the second optical element, and wherein the first optical element has a characteristic of reflecting the image light having a second angle as the incident angle, the second angle being an angle with which the image light passed through the second optical element enters the first optical element, wherein the second optical element further has a characteristic of reflecting the image light having a third angle as the incident angle, the third angle being an angle with which the image light reflected by the first optical element enters the second optical element, and wherein the first optical element further has a characteristic of transmitting the image light having a fourth angle as the incident angle, the fourth angle being an angle with which the image light reflected by the second optical element enters the first optical element.

3. The virtual image generation device according to claim 2, wherein the first optical element has the characteristic of reflecting the image light incident with the second angle by the third angle larger than the second angle, and wherein the second optical element has the characteristic of reflecting the image light incident with the third angle by the fourth angle smaller than the third angle.

4. The virtual image generation device according to claim 1, wherein the first optical element and the second optical element are disposed on opposite sides of a single transparent base plate.

5. The virtual image generation device according to claim 1, wherein the first optical element and the second optical element have the characteristic of reflecting the light in accordance with the incident angle, based on a range in which the angle formed by the first optical element and the second optical element varies.

6. The virtual image generation device according to claim 1, wherein at least one of the first optical element and the second optical element is a dielectric multilayer.

7. The virtual image generation device according to claim 1, wherein the first optical element and the second optical element further give the image light a lens effect.

8. The virtual image generation device according to claim 1, wherein at least one of the first optical element and the second optical element is a volume type HOE.

9. A head-up display comprising:
an image forming unit; and
the virtual image generation device according to claim 1, which visualizes the image formed by the image forming unit as the virtual images.

10. The head-up display according to claim 9,
wherein the image forming unit is mounted around a dashboard of a vehicle, and
wherein the virtual image generation device is mounted near a ceiling of the vehicle.

11. The head-up display according to claim 9,
wherein the image forming unit is mounted around a dashboard of a vehicle, and
wherein the virtual image generation device is formed in a glasses-shape.

12. The virtual image generation device according to claim 1, further comprising a holding unit configured to hold at least one of the first optical element and the second optical element and operable to change the angle formed by the first optical element and the second optical element.

13. The virtual image generation device according to claim 12, wherein the holding unit comprises a first holding part and a second holding part, the first and second holding parts being attached in a manner rotatable around a common axis.

14. The virtual image generation device according to claim 13, wherein the first holding part holds the first optical element and the second holding part holds the second optical element.

15. The virtual image generation device according to claim 14, wherein the first optical element is a first dielectric multilayer and a first base plate, and the second optical element is a second dielectric multilayer and a second base plate.

* * * * *